United States Patent
Katsurada et al.

(10) Patent No.: US 9,899,943 B2
(45) Date of Patent: Feb. 20, 2018

(54) POWER GENERATION CONTROL DEVICE OF VEHICLE ALTERNATING CURRENT GENERATOR

(71) Applicant: Mitsubishi Electric Corporation, Tokyo (JP)

(72) Inventors: Keisuke Katsurada, Tokyo (JP); Katsuyuki Sumimoto, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 0 days.

(21) Appl. No.: 15/300,876

(22) PCT Filed: Jul. 11, 2014

(86) PCT No.: PCT/JP2014/068558
§ 371 (c)(1),
(2) Date: Sep. 30, 2016

(87) PCT Pub. No.: WO2016/006095
PCT Pub. Date: Jan. 14, 2016

(65) Prior Publication Data
US 2017/0019046 A1    Jan. 19, 2017

(51) Int. Cl.
*H02P 9/30*    (2006.01)
(52) U.S. Cl.
CPC ..................................... *H02P 9/30* (2013.01)
(58) Field of Classification Search
CPC ........................................................ H02P 9/30
USPC ............................ 322/70, 28, 24, 20, 44, 22
See application file for complete search history.

(56) References Cited

U.S. PATENT DOCUMENTS

| | | | | |
|---|---|---|---|---|
| 4,727,307 A * | 2/1988 | Kaneyuki | ................. | H02P 9/30 322/22 |
| 5,731,689 A * | 3/1998 | Sato | ...................... | H02J 7/1446 322/20 |
| 7,106,028 B2 * | 9/2006 | Iwatani | ................... | H02P 9/305 322/25 |
| 2005/0231174 A1 * | 10/2005 | Iwatani | ................... | H02P 9/305 322/25 |
| 2010/0123439 A1 * | 5/2010 | Steele, Jr. | ............... | H02P 9/305 322/24 |

(Continued)

FOREIGN PATENT DOCUMENTS

JP    2013-219965 A    10/2013

*Primary Examiner* — Viet Nguyen
(74) *Attorney, Agent, or Firm* — Sughrue Mion, PLLC; Richard C. Turner

(57) ABSTRACT

The invention enables durability in a higher temperature environment to be ensured without changing mechanical design specifications. A power generation control device for controlling generator output to a predetermined range by intermittently controlling a field current of a vehicle alternating current generator, includes a limit deactivation signal reception unit that receives a limit deactivation signal of the field current from an exterior, a rotation speed detection unit that detects generator rotation speed, a temperature detection unit that detects temperature of the power generation control device, and a limit activation/deactivation determination unit that, when the limit deactivation signal is input, deactivates the field current limit under predetermined rotation speed and temperature conditions.

9 Claims, 5 Drawing Sheets

(56) References Cited

U.S. PATENT DOCUMENTS

| | | | |
|---|---|---|---|
| 2010/0194355 A1* | 8/2010 | Wada | B60L 11/12 |
| | | | 322/22 |
| 2012/0112709 A1* | 5/2012 | Akita | H02P 9/30 |
| | | | 322/34 |
| 2013/0049460 A1* | 2/2013 | Herbig | H02P 9/48 |
| | | | 307/10.1 |
| 2013/0271093 A1* | 10/2013 | Komurasaki | H02P 9/30 |
| | | | 322/23 |

* cited by examiner

POWER GENERATION CONTROL DEVICE OF VEHICLE ALTERNATING CURRENT GENERATOR

CROSS REFERENCE TO RELATED APPLICATIONS

This application is a National Stage of International Application No. PCT/JP2014/068558 filed Jul. 11, 2014, the contents of all of which are incorporated herein by reference in their entirety.

TECHNICAL FIELD

The present invention relates to a power generation control device of a vehicle alternating current generator driven by an internal combustion engine, and in particular, relates to a power generation control device of a vehicle alternating current generator that realizes durability in a high temperature environment without mechanical design specifications being changed.

BACKGROUND ART

Design of an existing vehicle alternating current generator is carried out in such a way that each part used is kept at or below an allowable temperature by output power of the generator being adjusted (adjusted in a downward direction), thereby reducing heat generated by the generator itself, as a method of realizing durability in a high temperature environment. In order to realize this, however, it is necessary to adjust mechanical design specifications, those being magnetomotive force of a generator field coil (coil wire diameter, number of turns), an air gap between a rotor and stator, and transmission efficiency such as a cooling fan of the generator, because of which man hours and costs for design change are high.

Also, there is a correlation between the field current flow and output power of a generator, because of which, when the mechanical design specifications of the field coil are changed in order to realize generator durability in a higher temperature environment, there is a problem in that output decreases over the whole rotation speed range and temperature range of the generator, and output power decreases invariably over the whole range of use, as shown in FIG. 6 and FIG. 7.

Meanwhile, there is a proposal whereby an electricity supply continuity rate restriction value is switched in order that the continuity rate of a supply of electricity to the field coil is restricted when the vehicle is cruising in a steady state, and the electricity supply continuity rate is increased when the vehicle decelerates, such as when regenerative power is generated, whereby a large amount of regenerative energy is obtained without the generator size increasing (refer to PTL 1).

However, PTL 1 is such that restriction of the electricity supply continuity rate is released only in a rotation range in which regenerative power generation is necessary (when decelerating), and no consideration is given to high temperature durability in other operating ranges. Also, the temperature of the generator rises abnormally in an environment wherein regenerative power generation is carried out frequently, with the result that characteristics of the generator are caused to depreciate.

CITATION LIST

Patent Literature

PTL 1: JP-A-2013-219965

SUMMARY OF INVENTION

Technical Problem

The invention, having been contrived in order to resolve this kind of problem, has an object of obtaining a power generation control device of a vehicle alternating current generator such that durability in a high temperature environment is further increased, without changing mechanical design specifications, by a restriction release signal, that is, a limit deactivation signal, being received from an external control unit that is monitoring vehicle information.

Solution to Problem

A power generation control device of a vehicle alternating current generator that forms the invention is a power generation control device that controls generator output to a predetermined range by intermittently controlling a field current of a vehicle alternating current generator, the power generation control device including a limit deactivation signal reception unit that receives a limit deactivation signal of the field current from an exterior, a rotation speed detection unit that detects generator rotation speed, a temperature detection unit that detects temperature of the power generation control device, and a limit activation/deactivation determination unit that, when the limit deactivation signal is input, deactivates a field current limit by allowing the deactivation signal when the generator rotation speed is equal to or greater than a predetermined value and the temperature of the power generation control device is lower than a predetermined value, and keeps the field current limit activated by disallowing the limit deactivation signal when the generator rotation speed is lower than the predetermined value or the temperature of the control device is equal to or higher than the predetermined value.

Advantageous Effects of Invention

According to the power generation control device of the invention, not only a regeneration (vehicle deceleration) range but also a sudden increase in an electrical load of a vehicle can be responded to by increasing generator output, without changing mechanical design specifications, by a restriction release signal, that is, a limit deactivation signal, being received from an external control unit that is monitoring vehicle information, whereby durability in a higher temperature environment can be ensured without causing a depreciation in generator characteristics.

Also, by restrictions being deactivated under predetermined rotation speed and temperature conditions, output power can be restricted only in a range of use in which the effect on generator durability is considered to be greatest.

DESCRIPTION OF EMBODIMENTS

First Embodiment

Figure 1:
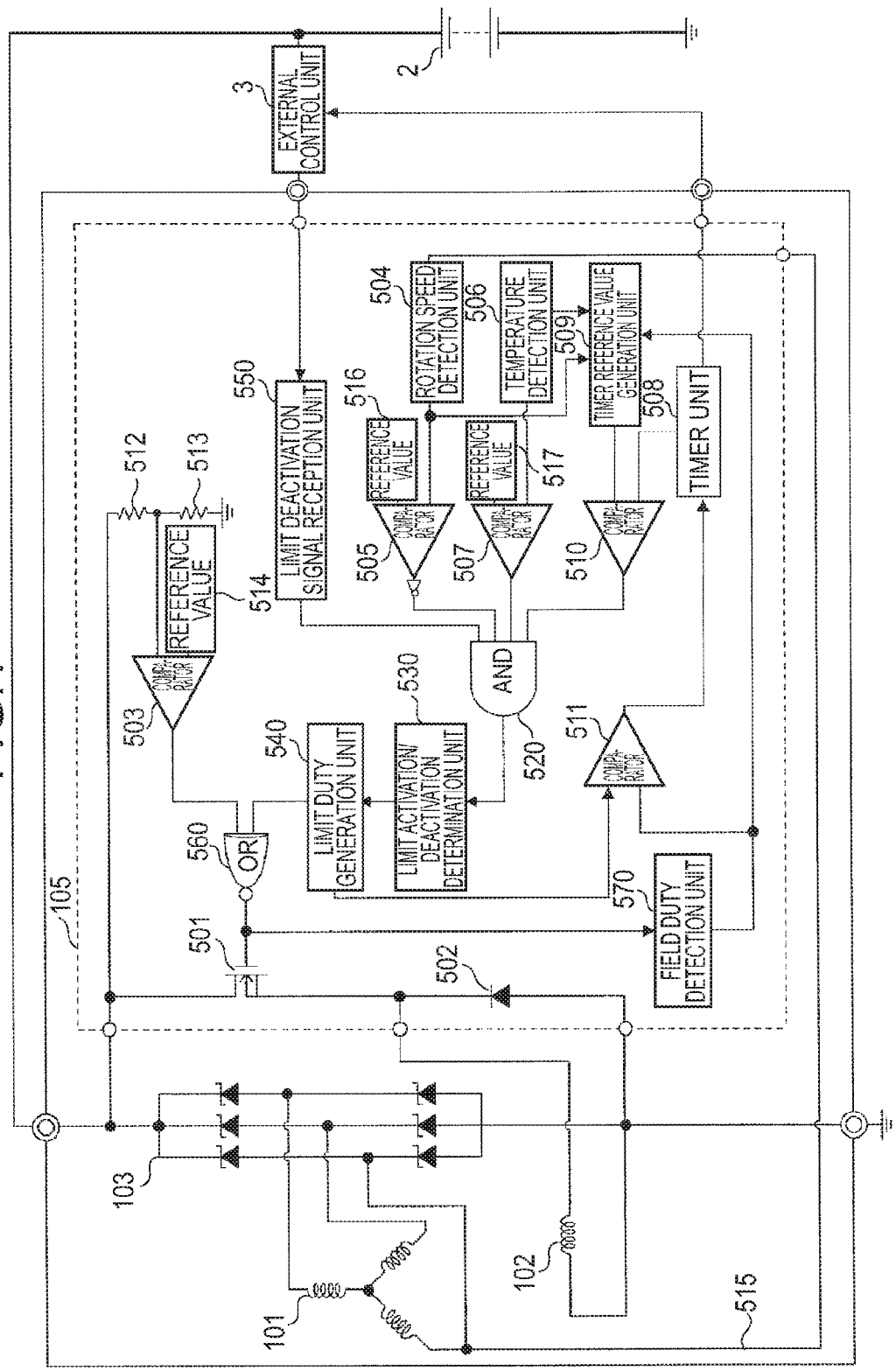
FIG. 1 is a circuit block diagram showing a power generation control device of a vehicle alternating current generator according to a first embodiment of the invention.

FIG. 1 is a diagram showing a circuit configuration of a power generation control device of a vehicle alternating current generator (hereafter referred to simply as generator) according to a first embodiment of the invention, which will be described in detail hereafter.

In FIG. 1, an alternating current generator 1 is mounted on an internal combustion engine via an unshown belt, and carries out power generation by obtaining a driving force from the internal combustion engine, but output of the alternating current generator 1 is controlled by a power generation control device 105, and the alternating current generator 1 supplies an output of generated power to a battery 2 and external control unit 3, and furthermore, to an unshown electrical load.

The generator 1 is configured to include a three-phase stator winding 101 included in a stator, an exciting winding 102 included in a rotor, and a rectifying circuit 103 that full-wave rectifies the three-phase output of the stator winding 101. Control of output voltage of the generator is carried out by energizing of the exciting winding 102 being appropriately intermittently controlled as hereafter described by the power generation control device 105.

Next, a configuration and operation of the power generation control device 105 will be described. The power generation control device 105 includes a field driver 501, which is an n-channel MOSFET, connected in series to the field winding 102, and a flywheel diode 502 connected in parallel to the exciting winding 102, and operates in such a way that an exciting current flows through the exciting winding 102 when the field driver 501 is in an on-state, and the exciting current is caused to flow back by the free wheeling diode 502 when the field driver 501 is in an off-state.

The power generation control device 105 includes a comparator 503 that detects generator output terminal voltage divided by resistors 512 and 513, and compares the voltage with a reference value 514 that coincides with a power generation voltage adopted as a target. When output of a limit duty generation unit 540, to be described hereafter, is fixed at a low potential, the comparator 503 outputs a low potential when the output voltage of the generator is lower than the target power generation voltage.

Because of this, a NOR circuit 560 of a subsequent stage outputs a high potential, thereby causing a field current to flow by turning on the field driver 501, and causing the output voltage to increase. Conversely, the comparator 503 outputs a high potential when the output voltage of the generator is higher than the target power generation voltage. The NOR circuit 560 of the subsequent stage outputs a low potential, thereby interrupting the field current by turning off the field driver 501, and causing the output voltage to decrease. It is well-known that the output voltage of the generator is controlled to the target power generation voltage value by this operation being repeated.

Various kinds of vehicle information are input into the external control unit 3, the electricity supply continuity rate to the field coil is increased, and efficient energy recovery can be carried out at a time of deceleration regeneration by commanding the generator to release a restriction when the vehicle decelerates based on, for example, vehicle speed information. Also, when the required output current of the vehicle momentarily becomes high, a limit deactivation signal is output to the generator, based on vehicle electrical load information, in order that full power can be output by releasing a field current limit.

A field duty detection unit 570 receives an output signal from the NOR circuit 560, and relatively detects field current flow by detecting the continuity rate of a supply of electricity (that is, field duty) to the field coil 102. A rotation speed detection unit 504 detects the generator rotation speed by a voltage signal of one phase of the stator coil 101 of the generator being input via a wire 515. The generator is mounted on the internal combustion engine via a belt, as previously described, and can indirectly detect the rotation speed of the internal combustion engine via the rotation speed detection unit 504.

Also, the power generation control device 105 includes a comparator 505 that compares the generator rotation speed detected as heretofore described and a reference value 516, wherein the comparator 505 outputs a low potential when the rotation speed is lower than the reference value, and a high potential when the rotation speed is equal to or higher than the reference value, to an AND circuit 520 of a subsequent stage. A temperature detection unit 506 detects temperature inside the power generation control device. Also, the power generation control device 105 includes a comparator 507 that compares the temperature detected as heretofore described and a reference value 517, wherein the comparator 507 outputs a high potential when the temperature is lower than the reference value, and a low potential when the temperature is equal to or higher than the reference value, to the AND circuit 520 of the subsequent stage.

Even when there is a divergence between the temperature of the control device and the temperature of another part, the accuracy of predicting that the temperature of the other part is high is increased by the power generation control device 105 including the detection units 504 and 506 of the two heretofore described parameters, that is, rotation speed and temperature.

Furthermore, the power generation control device 105 includes a limit deactivation signal reception unit 550 that receives a deactivation signal from the external control unit (ECU) 3 included on the exterior of the power generation control device 105, wherein the limit deactivation signal reception unit 550 outputs a low potential when no deactivation command is received from the external control unit 3, and outputs a high potential when a deactivation command is received.

When an output from a comparator 510, to be described hereafter, is not once considered (Lo potential), the AND circuit 520 outputs a high potential only when the rotation speed is equal to or higher than a predetermined value, the temperature of the control device is lower than a predetermined value, and a field current limit deactivation signal is received.

A limit activation/deactivation determination unit 530 outputs a signal activating the field current limit when a low potential signal is input from the AND circuit 520 of the previous stage, and a signal deactivating the field current limit when a high potential signal is input from the AND circuit 520, to the limit duty generation unit 540 of a subsequent stage.

When a field current limit deactivation signal is received from the limit activation/deactivation determination unit 530, the limit duty generation unit 540 outputs a low potential duty 0% (Lo fixed) PWM signal to the NOR circuit 560 of the next stage, and the field driver 501 is controlled only by the output signal of the voltage control comparator 503. Meanwhile, when a limit activation signal is received from the limit activation/deactivation determination unit 530, the limit duty generation unit 540 increases the low potential duty from the low potential duty 0% to a preset limit duty with a predetermined time coefficient. Also, in a case too wherein the current limit is deactivated from a state limited by a predetermined duty, the duty is reduced to duty 0% with a predetermined time coefficient.

The NOR circuit 560 synthesizes input signals from the voltage control comparator 503 and limit duty generation unit 540, and on/off control of the field driver 501 is carried out by the output of the NOR circuit 560.

Generally, generator output is proportional to rotation speed, because of which the lower the rotation speed with respect to the same required output current, the greater the necessary field current, and the higher the part temperature. Also, cooling air generated in the generator itself tends to be less the lower the rotation speed. Generator temperature is measured in the power generation control device, and when the rotation speed is low even when there is a divergence between the temperature of the power generation control device and that of another part, it can be predicted that the temperature is high, as heretofore described, and the accuracy of predicting that the temperature of the other part is high is increased.

Consequently, the power generation control device according to the invention includes the limit deactivation signal reception unit 550, which receives a field current limit deactivation signal from the exterior, and the detection units 504 and 506 of the generator rotation speed and power generation control device temperature, and when a deactivation signal is input, the power generation control device allows the deactivation signal, thereby deactivating the field current limit, when the generator rotation speed is equal to or greater than a predetermined value and the control device temperature is lower than a predetermined value. Contrarily, the power generation control device does not allow the deactivation command when the generator rotation speed is lower than the predetermined value, or when the control device temperature is equal to or higher than the predetermined value, controlling in such a way that the field current limit remains activated.

Next, the power generation control device of the invention includes the timer unit 508 which, when a field current limit deactivation signal is received from the exterior, the heretofore described conditions are met, and deactivation is allowed, measures the time from the generator field duty (electricity supply continuity rate) reaching the limit duty. Also, the power generation control device includes a function of measuring deactivation time, and reactivating the field current limit when a cumulative value reaches a predetermined time (timer time: t1), and furthermore, includes a function of enabling the field current limit to be deactivated again when the cumulative time from once reaching the timer time t1 and the field current limit being activated drops to a recovery time t2. Hereafter, a related operation will be described using a specific circuit configuration.

The field duty detection unit 570 detects the actual value of field duty, as previously described, and this information is transmitted to a timer reference value generation unit 509. Meanwhile, a comparator 511 compares a limit duty value set in the limit duty generation unit 540 and the actual field duty from the field duty detection unit 570, and transmits a count-up signal to the timer unit 508 of a subsequent stage when the actual field duty reaches the limit duty. Contrarily, the comparator 511 transmits a count-down signal to the timer unit 508 when the actual field duty drops below the limit duty.

The timer unit 508 starts a timer count when a count-up signal is received from the comparator 511, and when a reference value coinciding with the arbitrary timer time t1 output from the timer reference value generation unit 509 is reached, the comparator 510 outputs a low potential, disallowing field current limit deactivation, and reactivating the field current limit.

By the timer unit 508 being included, release limit deactivation is prevented from continuing, even when there is a divergence between the temperature of the power generation control device 105 and the temperature of another part.

Furthermore, the power generation control device 105 has a function whereby the cumulative time is reduced after the cumulative time reaches the timer time t1 and the field current limit is once deactivated, and a state wherein deactivation of the field current limit is enabled again can be attained by the cumulative time reaching the recovery time t2.

The timer reference value generation unit 509 varies the timer time t1 from the field current limit being deactivated to being reactivated, and the recovery time t2, in accordance with the rotation speed information from the generator rotation speed detection unit 504 and the power generation control device temperature information from the temperature detection unit 506, sets the timer time t1 and recovery time t2 to be longer (with a 0 second reference) the higher the rotation speed and the lower the temperature, and sets the timer time t1 and recovery time t2 to be shorter the lower the rotation speed and the higher the temperature.

Also, the timer reference value generation unit 509 includes a function of, based on information from the field duty detection unit 570, setting the timer time t1 and recovery time t2 to be shorter (with a 0 second reference) the higher the field duty, and setting the timer time t1 and recovery time t2 to be shorter the higher the field duty.

Figure 2:
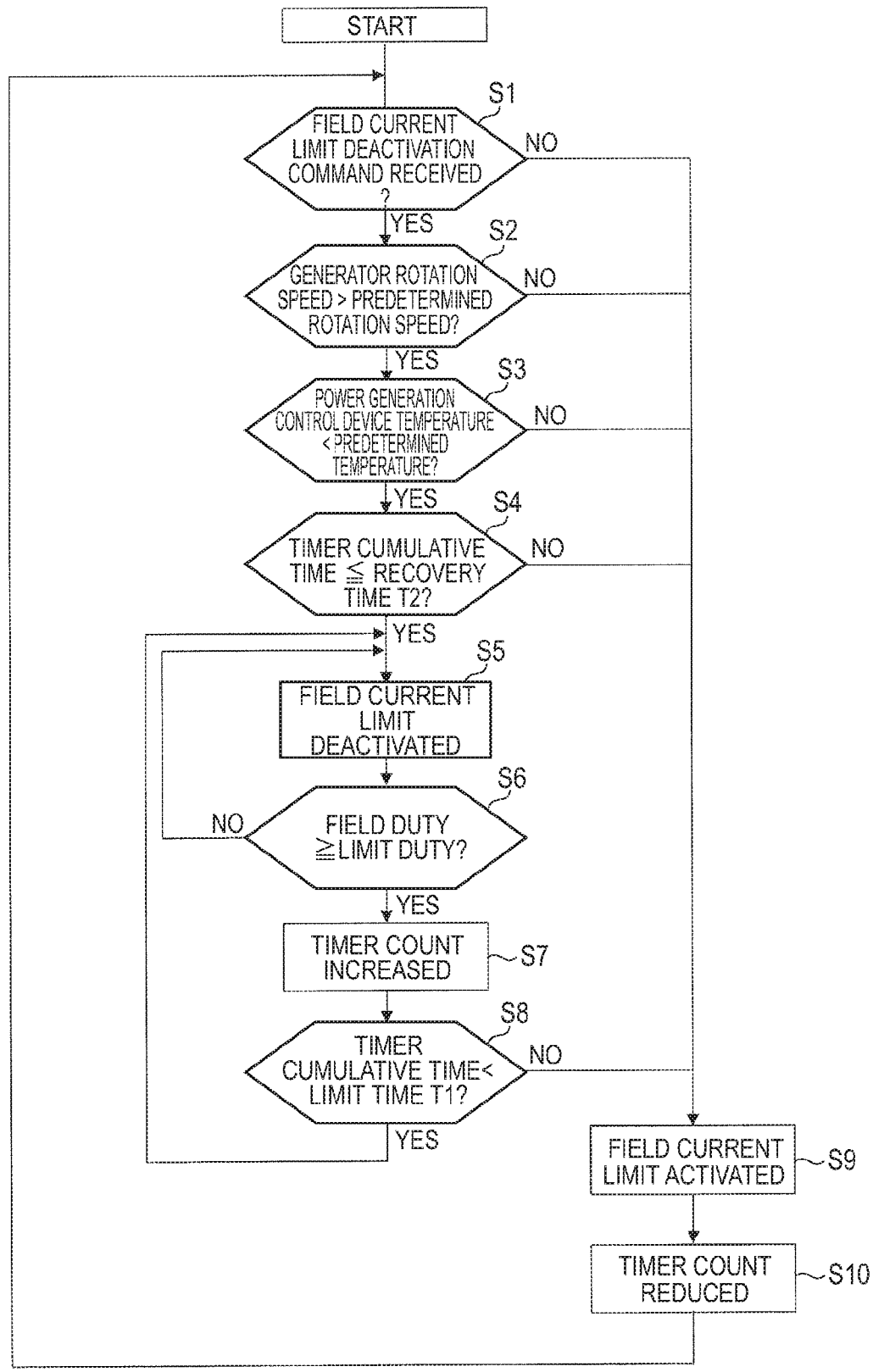
FIG. 2 is a flowchart showing an operating procedure of the power generation control device in the first embodiment of the invention.

FIG. 2 illustrates an operational state of the heretofore described power generation control device using a flowchart. When the power generation control device 105 receives a field current limit deactivation signal from the external control unit 3 (S1), the power generation control device 105 determines whether or not the generator rotation speed is equal to or greater than a predetermined rotation speed (S2). When the generator rotation speed is equal to or greater than the predetermined rotation speed, the power generation control device 105 determines whether or not the temperature of the power generation control device is lower than a predetermined value (S3). When the generator rotation speed is lower than the predetermined value or the temperature of the power generation control device is equal to or higher than the predetermined value, the power generation control device 105 keeps the field current limit activated (S9).

Furthermore, the power generation control device 105 determines whether or not the cumulative timer time of the timer unit 508 is equal to or lower than the recovery time t2 (S4), and also keeps the field current limit activated when the recovery time has not been reached (S9).

In other cases, the power generation control device 105 deactivates (releases) the field current limit, and increases the generator output (S5). Next, the generator output increases (the field duty increases), the power generation control device 105 determines whether or not the field duty has reached a predetermined limit duty (S6), and increases the timer count from the point at which the field duty reaches the predetermined limit duty (S7).

A range in which the field duty does not reach the predetermined limit duty is a small range as a load of the generator, and no increase of the timer count is carried out.

Next, the power generation control device 105 determines whether or not the increased cumulative timer time has reached the predetermined limit time t1 (58), reactivates the field current limit when the predetermined limit time is reached (S9), and reduces the timer count (S10).

A state wherein the field current limit can be released is attained by the timer count being reduced to the recovery time.

Figure 3:
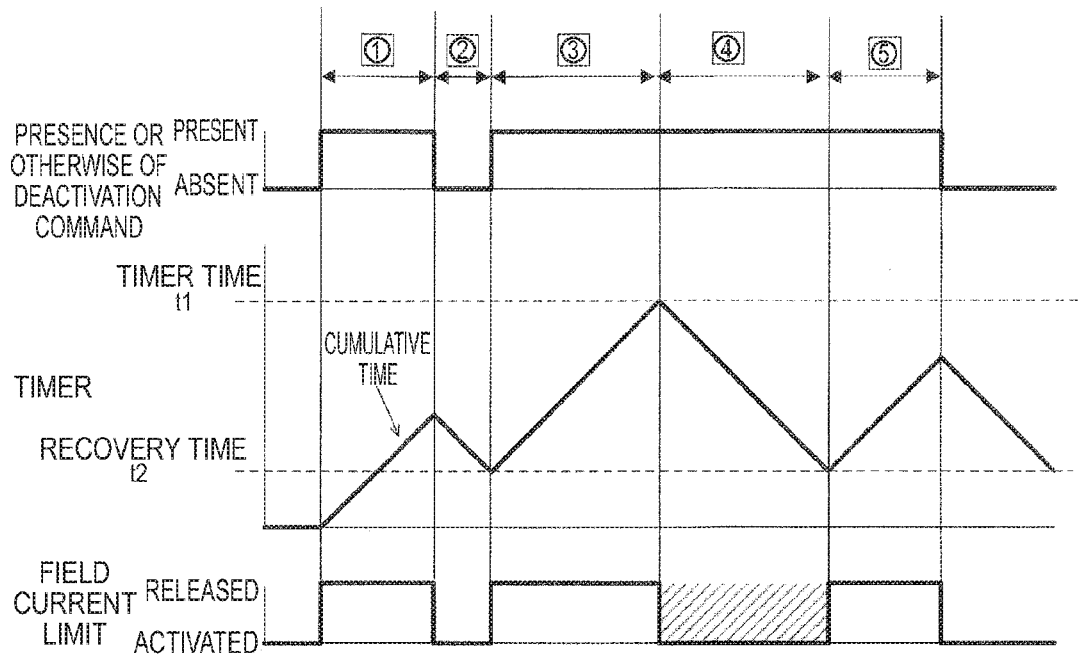
FIG. 3 is a diagram illustrating in detail an operating state of the power generation control device in the first embodiment of the invention.

FIG. 3 is a waveform diagram showing how the presence or otherwise of a deactivation command, a timer operational state, and the presence or otherwise of a field current limit change with respect to time (horizontal axis), and is for illustrating operations in the first embodiment of the invention more easily still.

In a period (1) in the diagram, the timer count is increased when a limit deactivation signal from the external control unit 3 is input into the generator, limit release is established, and furthermore, the field duty reaches the limit duty. As the cumulative time does not reach the timer time t1 at this time, the limit remains released (in the diagram, the field duty is shown in a state of reaching the limit duty).

In a period (2), contrarily, there is no deactivation command input, in which case the timer count is reduced. In a period (3), there is a deactivation command input, because of which the timer count is increased, and when the cumulative time reaches the timer time t1, the field current limit is activated (diagonal line portion), ignoring a command from the exterior. Subsequently, in a period (4), the timer count is reduced, the cumulative time decreases to the recovery time t2, and a state wherein the field current limit can be released is attained.

In a period (5), there is a state wherein the field current limit can be released, because of which the limit is released again, and the timer count is increased.

Figure 4:
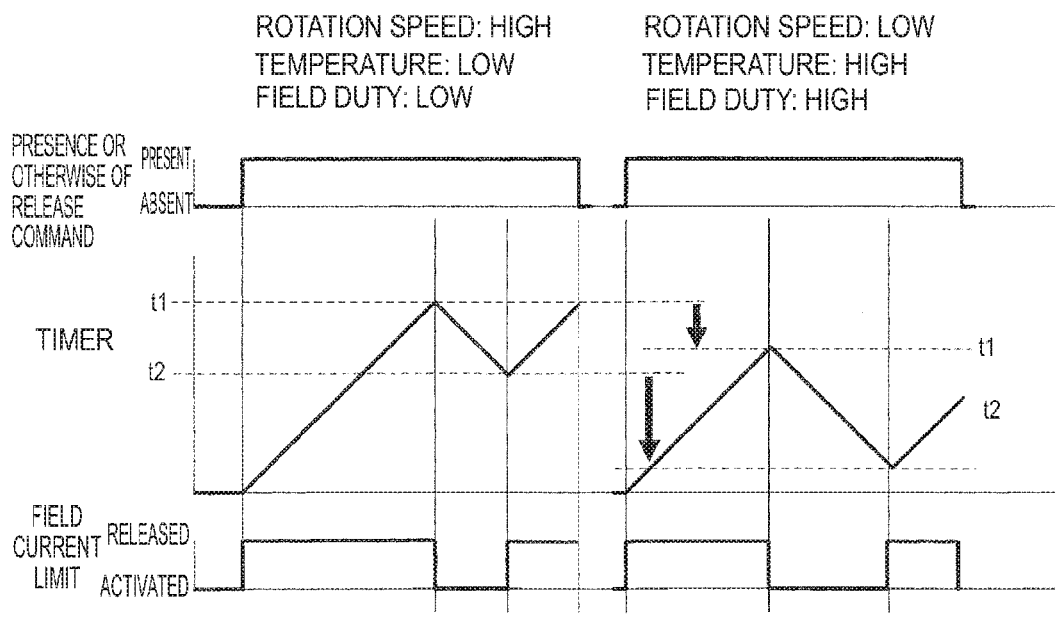
FIG. 4 is a diagram illustrating another operating state of the power generation control device in the first embodiment of the invention.

FIG. 4 shows another operation example, wherein the timer time t1 and recovery time t2 are controlled in accordance with the details of the generator rotation speed, power generation control device temperature, and field duty information input into the timer reference value generation unit 509. That is, the timer time t1 and recovery time t2 are set to be predetermined coefficients that are longer the higher the generator rotation speed and the lower the power generation control device temperature, and contrarily, the timer time t1 and recovery time t2 are set to be predetermined coefficients that are shorter the lower the generator rotation speed and the higher the power generation control device temperature.

Consequently, the generator is prevented from outputting for too long at a high temperature and reducing lifespan, whereby safety can be increased.

Also, by the duty being increased or reduced with predetermined time coefficients, a sudden torque change in the generator caused when switching between field limit activation and deactivation can be relaxed.

Second Embodiment

Figure 5:
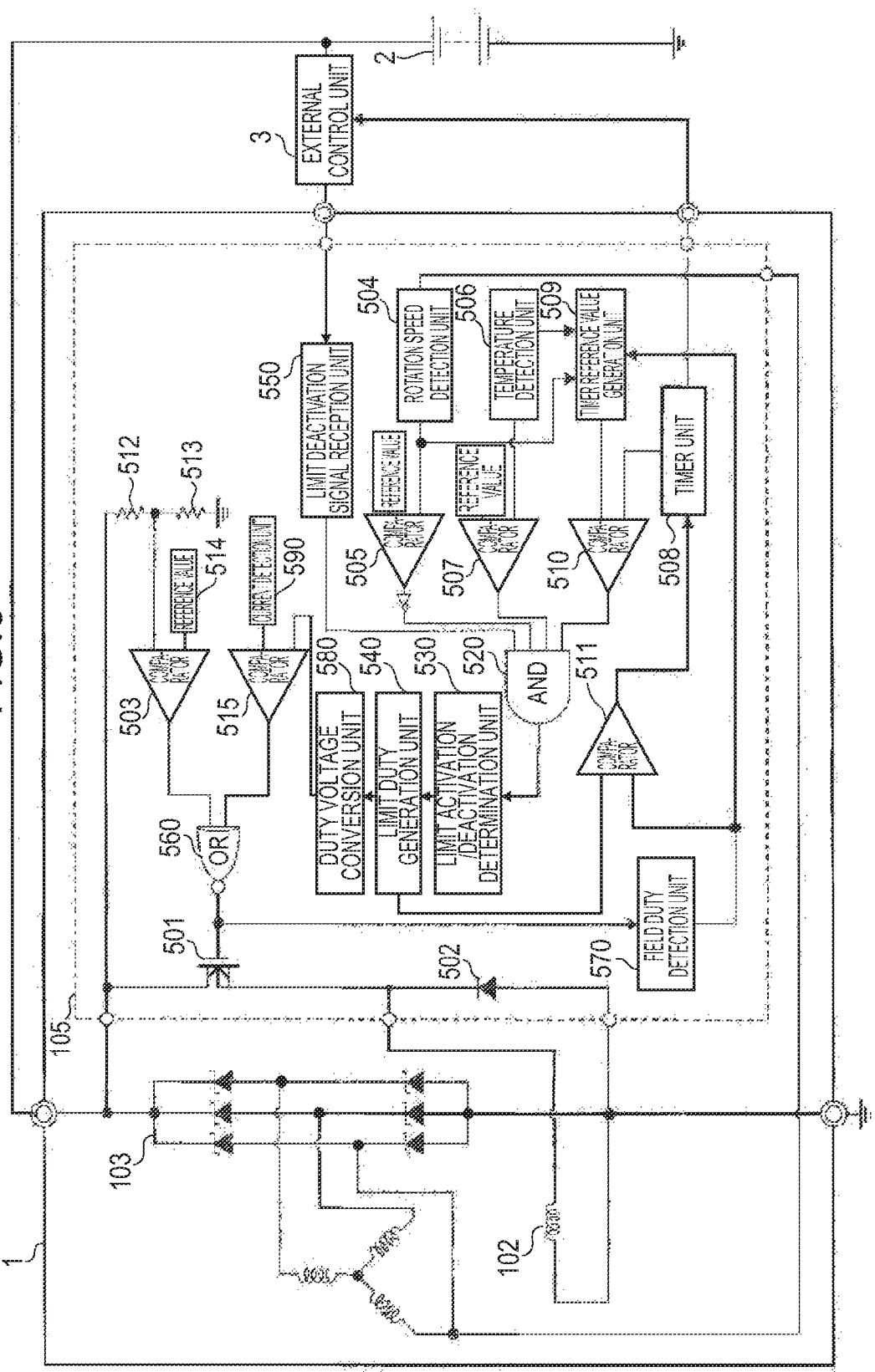
FIG. 5 is a circuit block diagram showing a power generation control device of a vehicle alternating current generator according to a second embodiment of the invention.
Figure 6:
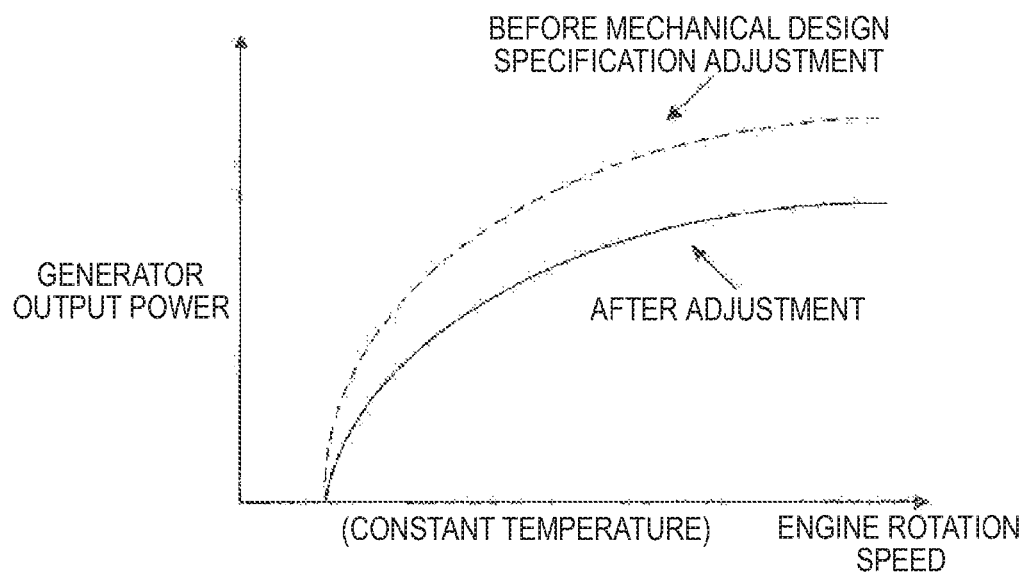
FIG. 6 is an illustration showing output power characteristics with respect to generator rotation speed of an existing power generation control device of a vehicle alternating current generator.
Figure 7:
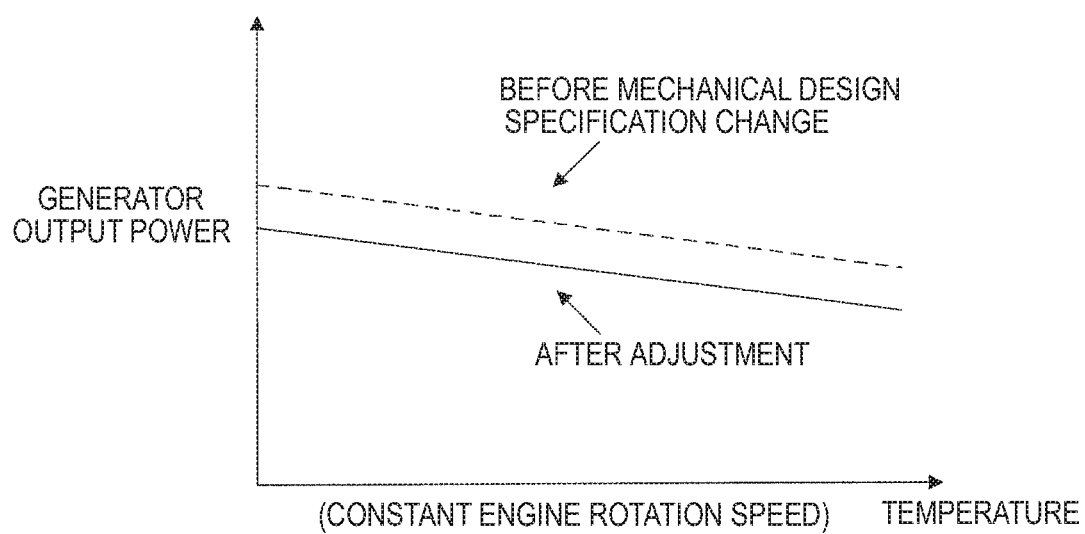
FIG. 7 is an illustration showing output power characteristics with respect to generator temperature of the existing power generation control device of the vehicle alternating current generator.

FIG. 5 is a circuit block diagram showing a power generation control device of a vehicle alternating current generator according to a second embodiment of the invention. In the diagram, the same reference signs are allotted to portions the same as or corresponding to portions in the first embodiment. The second embodiment includes a current detection unit 590, which directly detects field current, as a field current limiting function. A current value of the current detection unit 590 and a limit current value determined in advance are compared, the field driver 501 is turned off when the current value of the current detection unit 590 is equal to or greater than the limit current value, and control is carried out dependent on the output voltage control comparator 503 when the current detection unit 590 is lower than the limit current value.

Actually, although not shown, the current detection unit 590 is such that the actual value of current to be sent to the field driver 501 is detected by a sense resistor or the like, and input into the comparator 515 after a current-to-voltage conversion is carried out. Meanwhile, a duty voltage conversion unit 580 receives a signal from the limit activation/deactivation determination unit 530, and generates the limit current value as a voltage value, which is used as a reference value of the comparator 515. Unlike the first embodiment, the subject of comparison in the second embodiment is not the duty but the voltage value, but control can be carried out in the same way as in the first embodiment when the field current is detected in this way.

Furthermore, what can be said for the power generation control devices of both the first embodiment and second embodiment is that, the actual value of the electricity supply continuity rate to the field coil and the limit duty value being output to the external control unit (ECU) 3, the external control unit 3 can know the remaining power generation capability of the generator, and can effectively utilize this in controlling engine rotation speed when an electrical load is turned on, and in deceleration regeneration. For example, when a large electrical load is turned on in a state wherein the remaining power generation capability of the generator is low, danger of a decrease in engine output can be circumvented by the engine rotation speed being increased, thereby increasing the power generation capability of the generator.

Also, by a difference between the cumulative time from deactivating the field current limit and the timer time t1, and a difference between the cumulative time from the timer time t1 being once reached and the field current limit being activated and the recovery time t2, being output to an external control unit, the remaining limit deactivation time can be detected, and can be utilized in controlling with an object of actively ensuring power generation within the remaining time. For example, the amount of fuel injected can be increased, thereby increasing engine rotation speed and ensuring an increase in generator output, within the remaining limit deactivation time, and by detecting that the time is zero, that is, a state wherein the limit has returned to an activated state, normal control can be resumed.

To give a still more specific description of this, when the difference between the cumulative time and the timer time t1 is 0, it can be determined that the limit is in an activated state, and in the same way, it can also be determined that the limit is in an activated state when the cumulative time and timer time are at a maximum (when no limit deactivation signal is being transmitted from the external control unit). Contrarily, by an increasing or decreasing tendency of time being detected by the external control unit at times other than those heretofore described too, it can be determined that the limit is in a deactivated state when a limit deactivation signal is being transmitted and the difference is tending to decrease, and that the limit is in an activated state when a limit deactivation signal is being transmitted and the difference is tending to increase. Consequently, when the external unit determines whether or not to transmit a limit deactivation signal, the external unit can know in advance whether or not the generator is in a state of being able to receive a limit, and can carry out a process of increasing the engine rotation speed, or the like.

The first embodiment is characterized in that the accuracy of information on the remaining power generation capability of the generator is increased by the difference between the field duty and limit duty being output, and output to the external control unit 3 existing on the vehicle side. When the remaining power generation capability of the generator is output to the external control unit 3 as a current value, as in the second embodiment, the maximum energizing current of the generator differs depending on the resistance value state of the field coil (the field coil resistance value differs depending on the electromagnetic specifications and power generation state of each model), because of which there is a problem in that information accuracy decreases.

Therefore, the second embodiment is such that duty information from the field duty detection unit is utilized in output to the external control unit 3, in the same way as in the first embodiment.

It will be evident to those skilled in the art that the invention, not being limited to the heretofore described embodiments, can be changed in various ways without departing from the scope of the invention.

REFERENCE SIGNS LIST

1 Generator, 2 Battery, 3 External control unit, 101 Stator winding, 102 Field winding, 103 Rectifying circuit, 105 Power generation control device, 501 Field driver, 502 Free wheeling diode, 503, 505, 507, 510, 511, 515 Comparator, 504 Rotation speed detection unit, 506 Temperature detection unit, 508 Timer unit, 509 Timer reference value generation unit, 512, 513 Resistor, 514, 516, 517 Reference value, 520 AND circuit, 530 Limit activation/deactivation determination unit, 540 Limit duty generation unit, 550 Limit deactivation signal reception unit, 560 NOR circuit, 570 Field duty detection unit, 580 Duty voltage conversion unit, 590 Current detection unit.

The invention claimed is:

1. A power generation control device of a vehicle alternating current generator, for controlling generator output to a predetermined range by intermittently controlling a field current of a vehicle alternating current generator, the power generation control device comprising:
a limit deactivation signal reception unit that receives a limit deactivation signal of the field current from an exterior;
a rotation speed detection unit that detects generator rotation speed;
a temperature detection unit that detects temperature of the power generation control device; and
a limit activation/deactivation determination unit that, when the limit deactivation signal is input, deactivates a field current limit by allowing the limit deactivation signal when the generator rotation speed is equal to or greater than a predetermined value and the temperature of the power generation control device is equal to or lower than a predetermined value, and keeps the field current limit activated by disallowing the limit deactivation signal when the generator rotation speed is equal to or lower than the predetermined value or the temperature of the control device is equal to or higher than the predetermined value.

2. The power generation control device of the vehicle alternating current generator according to claim 1, further comprising:
a field duty detection unit for detecting a field duty which is an electricity supply continuity rate to the field coil of the generator;
a limit duty generation unit for generating a predetermined limit duty in accordance with signals from the limit activation/deactivation determination unit; and
a timer unit for measuring a deactivation time from the field duty reaching the limit duty, wherein
when the limit deactivation signal of the field current is received from the exterior and deactivation is allowed, the deactivation time is measured, the field current limit is reactivated when a cumulative value of the deactivation time reaches a predetermined timer time t1, and deactivation of the field current limit is enabled again when the cumulative value decreases to a recovery time t2 after once reaching the timer time t1 and the field current limit being activated.

3. The power generation control device of the vehicle alternating current generator according to claim 2, wherein the timer time t1 and recovery time t2 are variable predetermined coefficients that are longer the higher the generator rotation speed and the lower the temperature of the power generation control device.

4. The power generation control device of the vehicle alternating current generator according to claim 2, wherein the timer time t1 and recovery time t2 are variable predetermined coefficients that are shorter the higher the field duty of the generator.

5. The power generation control device of the vehicle alternating current generator according to claim 2, wherein the power generation control device outputs a difference between the cumulative time from deactivating the field current limit and the timer time t1, and a difference between the cumulative time from the timer time t1 being once reached and the field current limit being activated and the recovery time t2, to an external control unit.

6. The power generation control device of the vehicle alternating current generator according to claim 1, wherein the power generation control device compares an actual value of a field duty which is an electricity supply continuity rate to the field coil of the generator and a value which represents a predetermined limit duty obtained from the limit activation/deactivation determination unit, and outputs a difference thereof to an external control unit.

7. The power generation control device of the vehicle alternating current generator according to claim 1, comprising:

a field current detector for directly detecting the field current of the generator; and a duty voltage conversion unit for generating a limit field current value as a voltage value in accordance with signals from the limit activation /deactivation determination unit, wherein when the limit deactivation signal of the field current is received from the exterior and deactivation is allowed, the deactivation time is measured, the field current limit is reactivated when a cumulative value reaches a predetermined timer time t1, and deactivation of the field current limit is enabled again when the cumulative time decreases to a recovery time t2 after once reaching the timer time t1 and the field current limit being activated.

8. The power generation control device of the vehicle alternating current generator according to claim 7, wherein the power generation control device outputs a difference between the cumulative time from deactivating the field current limit and the timer time t1, and a difference between the cumulative time from the timer time t1 being once reached and the field current limit being activated and the recovery time t2, to an external control unit.

9. The power generation control device of the vehicle alternating current generator according to claim 7, wherein the power generation control device compares an actual value of a field duty which is an electricity supply continuity rate to the field coil of the generator and a value which represents a predetermined limit duty obtained from the limit activation/deactivation determination unit, and outputs a difference thereof to an external control unit.

* * * * *